(12) United States Patent
Milburn

(10) Patent No.: US 6,699,559 B1
(45) Date of Patent: Mar. 2, 2004

(54) HONEYCOMB TRANSPARENT INSULATION WITH IMPROVED INSULATING ABILITY

(75) Inventor: Douglas I. Milburn, Sydney (CA)

(73) Assignee: Advanced Glazings Ltd., Sydney (CA)

(*) Notice: Subject to any disclaimer, the term of this patent is extended or adjusted under 35 U.S.C. 154(b) by 0 days.

(21) Appl. No.: 10/089,160

(22) PCT Filed: Sep. 26, 2000

(86) PCT No.: PCT/CA00/01109
§ 371 (c)(1),
(2), (4) Date: Jul. 19, 2002

(87) PCT Pub. No.: WO01/23813
PCT Pub. Date: Apr. 5, 2001

(30) Foreign Application Priority Data

Sep. 27, 1999 (CA) .............................................. 2283890

(51) Int. Cl.⁷ ................................................. B32B 3/00
(52) U.S. Cl. ........................... 428/73; 428/116; 428/34; 428/119; 428/220; 428/402; 428/403; 428/426; 428/446; 428/689; 428/702; 428/913; 359/350; 359/359; 359/591; 359/596; 359/614; 427/162; 427/164; 427/165; 427/209; 427/221; 427/230; 264/176.1; 264/177.12
(58) Field of Search ................................ 428/116, 117, 428/118, 73, 34, 119, 188, 220, 402, 465, 446, 426, 688, 689, 702, 913; 181/284, 288, 289, 296; 359/350, 559, 361, 591, 596, 601, 614; 427/162, 164, 165, 212, 209, 221, 230; 264/176.1, 177.2

(56) References Cited

U.S. PATENT DOCUMENTS

| | | | | |
|---|---|---|---|---|
| 4,970,193 A | * | 11/1990 | Liang et al. | |
| 5,167,217 A | | 12/1992 | Klier et al. | 126/561 |
| 5,830,548 A | * | 11/1998 | Andersen et al. | |
| 5,923,044 A | * | 7/1999 | Hall et al. | |
| 5,986,824 A | * | 11/1999 | Mercado | |

FOREIGN PATENT DOCUMENTS

| | | |
|---|---|---|
| EP | 0 030 288 A | 6/1981 |
| GB | 1 555 795 A | 11/1979 |

* cited by examiner

Primary Examiner—Deborah Jones
Assistant Examiner—Wendy Boss
(74) Attorney, Agent, or Firm—Marks & Clerk

(57) ABSTRACT

An inorganic particulate, having strong absorption in the thermal infrared region of the radiative spectrum and low absorption in the solar or visible portion of the radiative spectrum, is combined with a plastic resin, to create a composite material. This composite is used in whole or in part to manufacture a honeycomb transparent insulation material, or is applied as a coating to a honeycomb transparent insulation material. The resulting honeycomb transparent insulation can have similar visible or solar light transmittance, and will have improved thermal radiant suppression relative to an identical honeycomb made of plastic resin only.

14 Claims, 3 Drawing Sheets

Comparison of Films and Blackbody Emissive Power at 300K

HONEYCOMB TRANSPARENT INSULATION WITH IMPROVED INSULATING ABILITY

FIELD OF THE INVENTION

This invention relates to the field of glazings and glazing systems, including windows, skylights, atriums, and greenhouses. More specifically, it relates to honeycomb transparent insulation materials that are used as components in glazing systems.

BACKGROUND OF THE INVENTION

Honeycomb transparent insulation was first developed in the early 1960's in order to enhance the insulation value of glazed systems, with minimum loss of light transmittance. Honeycomb transparent insulations are transparent-walled honeycombs, with open-ended cells whose axes are oriented parallel to the normal vector of the plane of the glazing. Honeycomb transparent insulation materials achieve high light transmittance because the cell walls are perpendicular to the plane of the glazing, and thus, any light that reflects from the cell wall continues in the forward direction. Thus these materials avoid the reflection-loss penalty that is incurred when extra glazings are inserted in the standard plane-parallel orientation.

Honeycomb transparent insulation materials provide insulation value by suppressing both convection and radiant heat. Honeycomb transparent insulation materials are typically made from transparent plastics such as acrylic, polycarbonate, or polypropylene. They are manufactured by a number of different techniques, including capillary bundling, extrusion, and film-fabrication. Their properties (such as light transmittance, insulation value, rigidity, weight, etc.) strongly depend on how they were manufactured. Examples of honeycomb transparent insulations are InsolCore®, a film-based transparent insulation made by Advanced Glazings Ltd., Nova Scotia, Canada, Kapillux®, a capillary-bundled transparent insulation made by Okalux Kapillarglas Gmbh. of Marktheidenfeld-Alffeld, Germany, and AREL®, an extruded transparent insulation made by Arel Energy Ltd., Yavne, Israel. The mechanisms by which heat transfers through honeycomb transparent insulation materials are well understood. They are well-described in the technical literature ("Coupled Radiative and conductive heat transfer across honeycomb panels and through single cells", K. G. T. Hollands et al., Int. J. Heat Mass Transfer v.27, n.11 pp. 2119–2131, 1984, "An approximate equation for predicting the solar transmittance of transparent honeycombs", K. G. T. Hollands, K. N. Marshall, and R. K. Wedel, Solar Energy, v.21 pp. 231–236, 1978). Like many other thermal insulators, honeycomb transparent insulations work by dividing an air gap into spaces that are too small to support free convection. It has been found, both experimentally and theoretically, that honeycomb cells with a hydraulic diameter on the order of 1 cm are sufficiently small to suppress free convection. ("Dimensional relations for free convective heat transfer in flat-plate collectors", K. G. T. Hollands, Proceeding of the 1978 Annual Meeting, ASES/ISES, Denver, Colo., vol. 2.1 pp 207–213, 1978). Thus an appropriately-designed honeycomb transparent insulation material does a thorough job of creating a dead air layer. Using smaller cells provides little improvement in suppressing the non-radiative portion of heat transfer, but does increase the amount of material required to manufacture that honeycomb transparent insulation.

To achieve maximum insulation value, a material must suppress radiative heat transfer in addition to conduction. The rate of radiant heat transfer through a honeycomb transparent insulation depends on the thermal-radiative emissivity of the boundary (i.e. the sheet(s) of glass or plastic adjacent to the honeycomb), the thermal-radiative emissivity of the cell wall, and the aspect ratio of the cell (defined as the ratio of the cell's hydraulic diameter to its length).

Boundary emissivity is generally a function of the glazing system in which a transparent insulation is used, and not a function of the transparent insulation material itself. Thus, for the sake of simplicity, the scope of background discussion will be limited to systems with high-emissivity boundaries, on the order of 0.9, such as are common for surfaces of glazing materials such glass or sheet plastics of thickness 0.030 or more. However the present invention can be used in glazing systems with other boundary emissivities.

To improve the radiant suppression (and therefore improve the insulation value) of a typical honeycomb transparent insulation made with plastic walls which are partially transparent to thermal radiation, it is necessary to do one of the following: (1) increase the aspect ration of the honeycomb; or (2) increase the emissivity of the cell walls. To accomplish option (1), it is necessary to either use a smaller cell diameter or a larger cell length (i.e. overall honeycomb thickness). But both of these modifications mean extra material usage and cost—material content increases with the inverse square of the cell diameter, and in proportion to the honeycomb thickness. Also, practical limitations may discourage greater thickness: for example, finished glazing units made of such insulation sandwiched between glass may be too thick to work with existing framing systems. Thus, Option (2), increasing wall emissivity, is attractive, and forms the basis for the present invention.

For materials and geometries typically found in honeycomb transparent insulations, cell-wall emissivity is a function of wall thickness and the type of material from which the wall is constructed. Present honeycomb transparent insulation materials are almost exclusively made from plastics such as polypropylene, acrylic, and polycarbonate, with typical wall thicknesses of 0.001" to 0.005", and have non-optimal wall emissivities (typically 0.15 to 0.40). As a result, present honeycombs have non-optimal ratio of performance to material content. This situation could be remedied by simply increasing wall thicknesses, but this is undesirable because the material content increases, raising the cost and weight.

Thus it is highly desirable to use a material that is inherently a strong absorber of thermal-infrared radiation. Inorganic materials such as glass or silica are highly-attractive materials for making transparent honeycombs, having excellent clarity and high emissivity for small thicknesses (a layer of glass thickness of 0.0003" has an emissivity of about 0.85). However, such materials are inherently difficult to work with in typical honeycomb geometries, and this has prevented the development of optimal glass honeycombs. Plastics, despite their imperfect radiative properties, are much easier to work with, and thus are the material of choice for today's commercial honeycomb transparent insulation.

Composite materials made with finely-divided inorganic fillers in plastic resins are commonplace in today's material technologies. Glass-filled thermoplastic resins are readily available to plastic processors, where typically the glass has been added to alter the elastic modulus or other physical properties of the plastic. Diatomaceous earth and calcium carbonate are regularly added to plastic resins when processing into plastic film in order to provide anti-block properties.

The addition of finely-divided inorganic fillers to plastic to create plastic film with enhanced infrared absorption is known. An example is 'infrared-blocked' polyethylene film for covering greenhouses, such as 'Duratherm' (AT Plastics, Toronto, Canada). A number of additive concentrates are readily available for creating such films. An example is Ampacet additive concentrate Product 10021 B-U (Ampacet Corp, Tarrytown, N.Y.) which contains a high percentage of Kaolin, a fine white silicate clay that does not absorb visible light but effectively absorbs infrared radiation, in a linear low-density polyethylene/ethylene vinyl acetate carrier. The presence of Kaolin typically interferes with the passage of visible light by increasing scattering (i.e. haze). Any haze in the wall of a honeycomb transparent insulation material will reduce the light transmittance via backscattering, and this can be advantageous or problematic, depending on the intended application.

U.S. Pat. No. 5,256,473 describes a finely-divided silica which is made by a water-milling process, that can be blended into clear thermoplastic resin during film-making, in order to make a clear, high-silica-content composite film with enhanced thermal infrared absorption. The film was described as useful for agricultural (greenhouse) and packaging applications.

U.S. Pat. No. 5,683,501 describes formulation that consists of a high loading of ultra-fine silica particulate, along with a plastic resin, in a liquid dispersion. This formulation is intended to as a coating that dries to a thin film with high clarity. This formulation is said to have advantages when used as a clear protective film, with respect to increased hardness, weatherability, and durability. The patent makes no mention of increased thermal-infrared absorption, although such a formulation will inherently have high absorption because of the silica content.

GB patent no. 1,555,795 describes a solar collector including a sheet containing a dispersed material to enhance absorption of long-wave radiation. However, such a sheet would typically tend to be cloudy and not suited for use in transparent insulation application.

Various inorganic particles, powders, fibers, etc., have varying compatibility with plastic resins with respect to the amount of effort required to uniformly disperse the additive, and with respect to the alteration of the crystallization of the thermoplastic structure (altering the crystallization mechanisms can potentially cause optical inhomogeneities and haze). Inorganics such as metal oxides tend to be hydrophilic, while plastics tend to be hydrophobic, and typically, the inorganics will tend to clump together to form larger aggregate particles during processing. As well, the plastic does not effectively 'wet' to the surface of the inorganic particles, and the resultant composite can have small gaps between the plastic matrix and the inorganic particles. These gaps contribute to light scattering and haze, and this effect can increase if the composite is physically stressed.

The mechanics of dispersing inorganic particles in plastic resins is well know in the arts of plastics processing, paint making, and other areas. Before dispersion, inorganic particles are often pre-coated with materials that increase their dispersability or alter other properties. Examples of materials used to precoat inorganic particles are organo-silanes, stearates, heavy alcohols, anionic surfactants, and waxes. Such techniques are applicable to inorganic pigments as well as to non-colouring materials. A number of techniques for improving dispersion of inorganic particles are described in the patent literature. For example, U.S. Pat. No. 4,283,322 describes a binder composition for coating glass fibers to improve their compatibility when blended with polypropylene. U.S. Pat. Nos. 5,318,625 and 5,830,929 describe organic-based coating treatments for improving the dispersibility of inorganic pigments or fillers, with emphasis on titanium dioxide, a commonly-used white pigment. U.S. Pat. No. 3,992,558 describes a process by which inorganic particles can be coated with a thin layer of a thermoplastic prior to blending into a thermoplastic compound, and it is claimed that very high loadings of inorganics can be achieved in this way.

SUMMARY OF THE INVENTION

According to the present invention there is provided a clear honeycomb transparent insulation comprising an array of open-ended cells whose axes are oriented normal to the plane of the insulation, said cells having walls comprising a composite material made of inorganic particles dispersed in a plastic resin binder, said inorganic particles and said plastic resin having similar refractive indices, characterized in that the size of said organic particles lies in the range 1 to 10 $\mu$m.

The basis for the present invention is the recognition that a composite material made from an inorganic, preferably of high-emissivity, and a plastic resin binder solves problems related to the use of either plastics or inorganics alone and can provide a clear material suitable for use as a transparent insulation.

An optimum material for manufacturing honeycombs combines the workability of plastics, with the strong thermal-radiative emissivity of inorganics such as glass, silica, alumina, silicate clays, or similar. Such a material can be created by dispersing a finely-divided inorganic particulate within a plastic resin which serves as a binder matrix. This inorganic-filled plastic can then be used to manufacture honeycomb transparent insulation, using techniques know to the the art, such as extrusion, capillary-bundling, and film-fabrication. A honeycomb transparent insulation made from such an inorganic/plastic composite represents an advance in the state of the art, because it provides better thermal insulation than an identical honeycomb transparent insulation made of plastic. This enhanced insulating capacity is a result of the additional radiative suppression provided by the presence of the inorganic particulate in the honeycomb cell walls. Also, inorganic/plastic composite-based honeycomb transparent insulations can be more stable and durable than plastic honeycombs, because the inorganics can provide increased resistance to UV and thermal degradation.

This invention can be used to create honeycomb transparent insulations that are dimensionally similar to those typical of the present state-of-the-art, yet offer increased insulation value. Alternatively, the invention can be used to create honeycombs that have thinner walls and/or lower aspect ratio, yet have insulating capability similar to state-of-the-art honeycombs. These thinner-walled and/lower aspect ratio honeycombs contain less material and are therefore lighter and more economical.

This invention may be implemented using a clear composite formulation, resulting in a honeycomb transparent insulation with maximum light transmittance. Additionally, this invention may be implemented with hazy or diffuse composite formulations, resulting in a honeycomb transparent insulation with reduced transmittance through backscattering losses. This can be used advantageously in systems for applications such as daylighting, where reduced light transmittance is desired. By reducing transmittance through backscattering, the glazing system avoids the internal heat buildup that would result if an absorption-based attenuation scheme was used.

The invention also provides a method of making honeycomb insulation comprising the step of fabricating honeycomb cells from a material including an inorganic/plastic composite to increase suppression of radiant transfer.

BRIEF DESCRIPTION OF THE DRAWINGS

The invention will now be described in more detail, by way of example only, with reference to the accompanying drawings, in which.

DETAILED DESCRIPTION AND PREFERRED EMBODIMENTS

Figure 1:
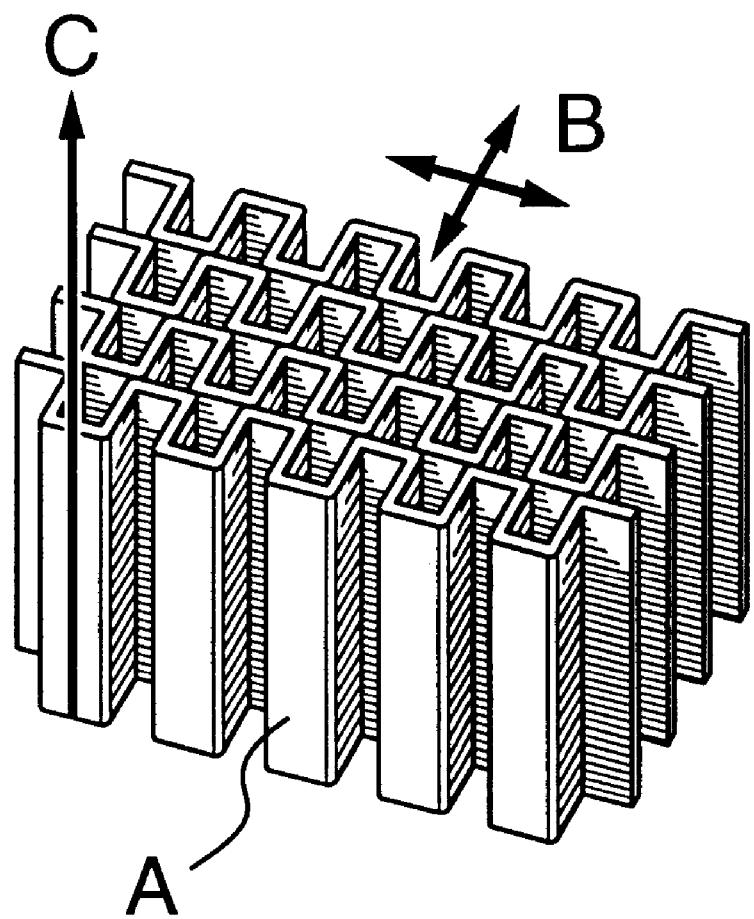
FIG. 1 shows a typical honeycomb transparent insulation, with walls made from transparent material which may or may not scatter light, and which have cell axes perpendicular to the plane of the honeycomb.
Figure 2:
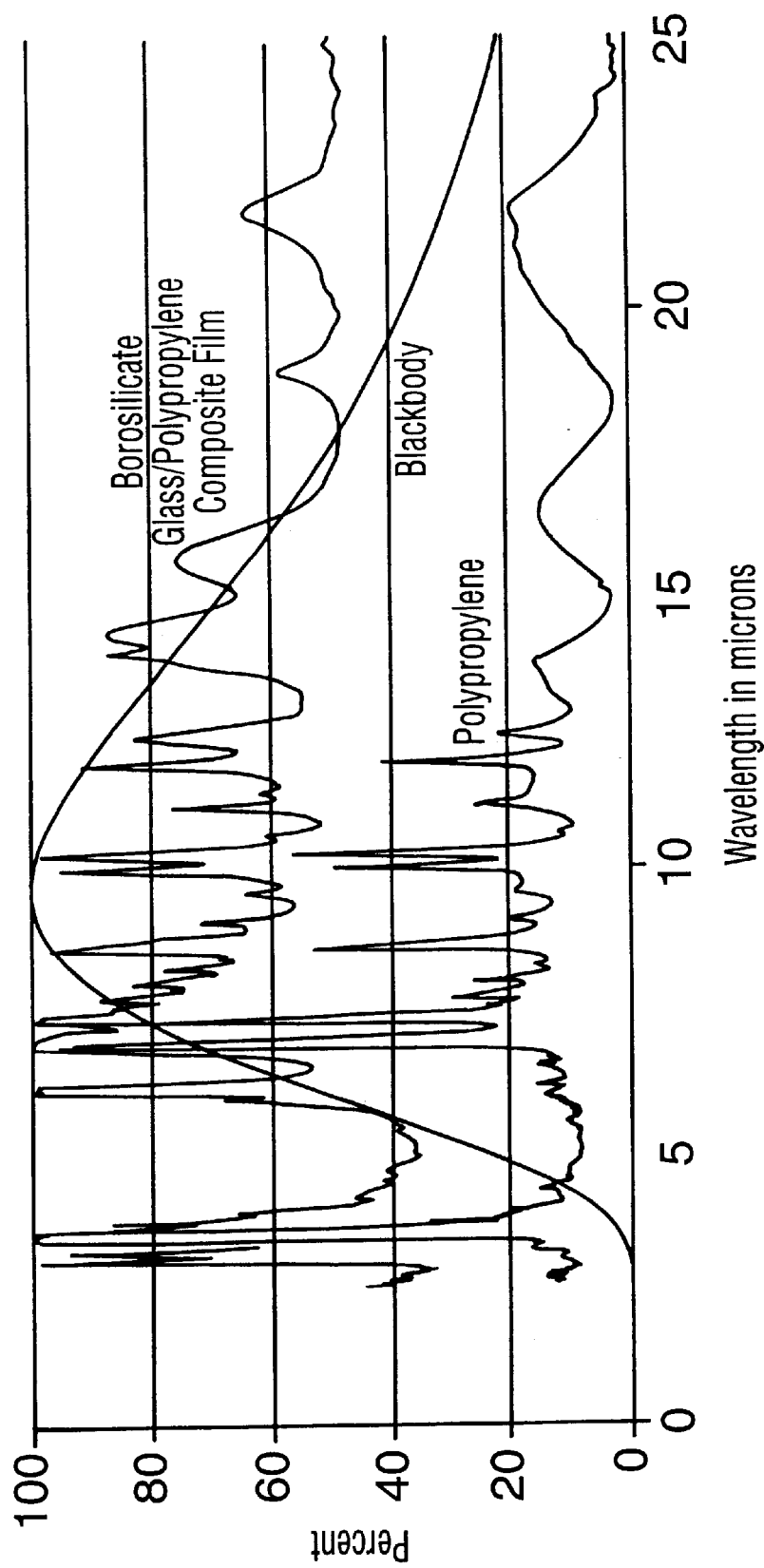
FIG. 2 shows the infrared absorption spectrum of (a) pure polypropylene film, 0.002" thickness, and (b) infrared absorption spectrum of a polypropylene/borosilicate glass composite similar to that described in example 1. Superimposed is a 300K blackbody emission spectrum. It can be seen that the composite film is a much better absorber than the pure polypropylene film.
Figure 3:
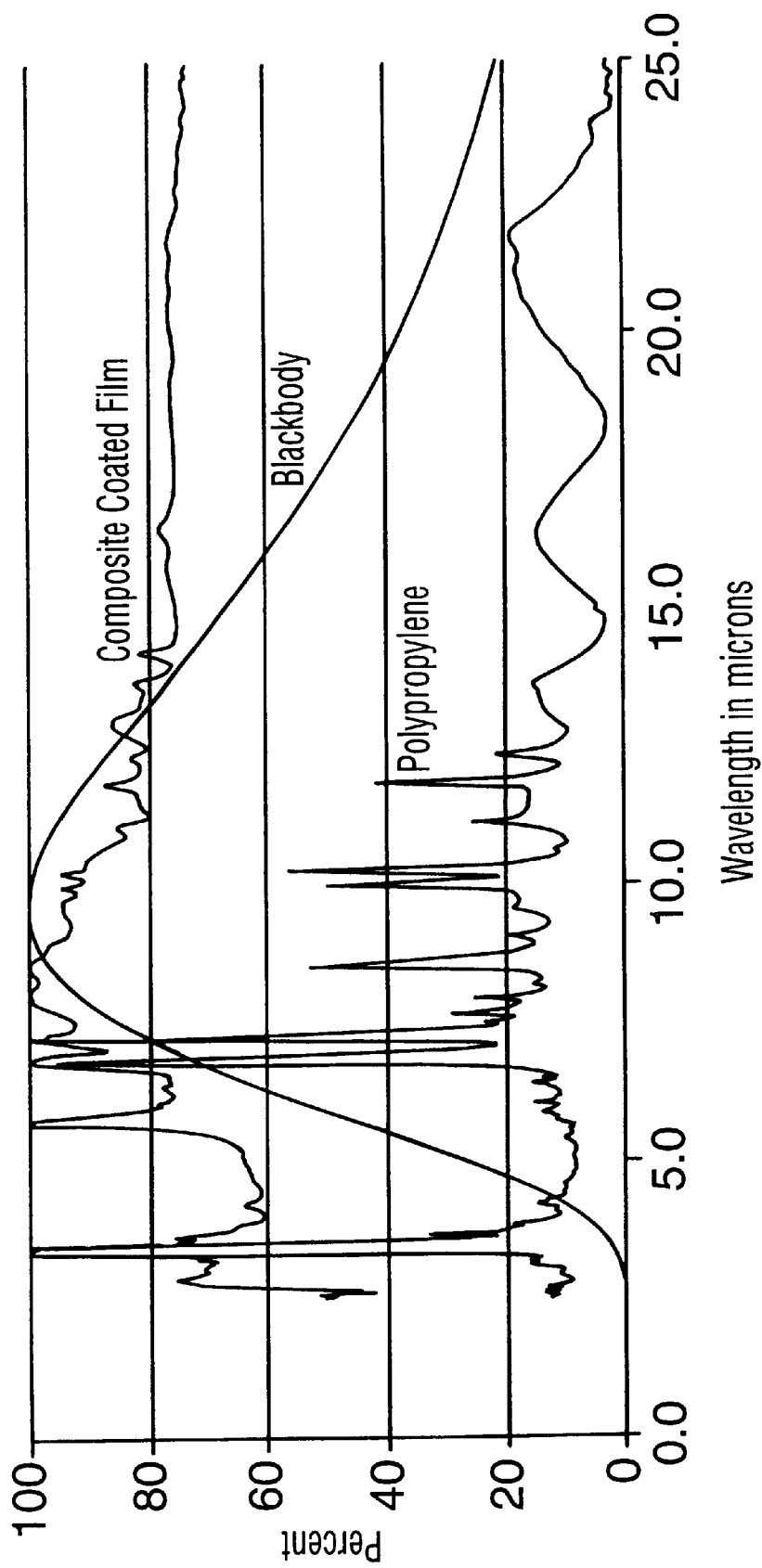
FIG. 3 shows the infrared absorption spectrum of (a) pure polypropylene film, 0.002" thickness, and (b) the coated film of Example 2. Superimposed is a 300K blackbody emission spectrum. It can be seen that the composite-coated film is a much better absorber than the pure polypropylene film.

A typical honeycomb transparent insulation is shown in FIG. 1. The cells A are aligned in direction C normal to plane B. Key parameters are wall thickness, cell height, cell cross-sectional area. The aspect ratio of the cells is defined as the ratio of the hydraulic diameter to the cell height, where the hydraulic diameter is the square root of the cell area divided by $\pi$.

In accordance with the principles of this invention, a composite material for making the honeycomb insulation is made by combining an appropriate finely-divided inorganic material with a plastic-resin binder. The plastic resin preferably meets some or all of the following criteria:

i) it can be formed in a way that is compatible with the honeycomb-making process;

ii) it should have negligible radiative absorption in the visible (400 nm to 700 nm) and/or solar (370 nm to 2500 nm) wavelength regions;

iii) it should have resistance to UV and thermal degradation, appropriate for the end use of the honeycomb;

iv) it has appropriate physical properties (such as elastic and shear modulus, melting point, and prolonged maximum service temperature) so that it can form a composite with properties suitable for the end use of the honeycomb.

Suitable plastics include polypropylene, polyethylene, polyvinyl chloride, acrylic, polycarbonate, polyurethane, polyester, and various fluoropolymers, which may or may not contain plasticizers, UV or thermal stabilizers, UV absorbers, or other additives. The materials may be thermoplastic or thermoset, and may be in the form of water-based or organic-based emulsions.

The inorganic particulate material preferably has some or all of the following:

i) negligible radiative absorption in the visible (400 nm to 700 nm) and/or solar (370 nm to 2500 nm) wavelength regions;

ii) strong radiative absorption/emissivity in the thermal infrared wavelength regions (2.5 $\mu$m to 50 $\mu$m overall, but most significantly, between 5 $\mu$m to 25 $\mu$m)

If the formulation is to be clear, the inorganic particulate should also have the following properties:

i) particle sizes in the range of either 1 $\mu$m to 30 $\mu$m, optimally 1 to 10 $\mu$m, or less than 200 nm;

ii) index of refraction that matches the plastic binder.

Examples of suitable materials are silica (natural or synthetic, fused or crystalline, in pyrolytic (fumed), precipitated, or milled forms), glass (soda lime, borosilicate, or other compositions, in microsphere, fibre, and milled form), kaolin, alumina, various aluminosilicate compounds, and titanium dioxide.

This invention can utilize either a single species of inorganic particle, or a combination of species. The inventors have found that infrared suppression can be achieved more efficiently (that is, by using less material) if a combination of materials is used. This is because materials absorb thermal infrared radiation most effectively only in certain regions of the thermal infrared. The amount of material that must be added to achieve saturated absorption (say, 90%) in regions of strong absorption is relatively small, while much larger amounts of material must be used to achieve saturated absorption in spectral regions where the absorption coefficient is moderate. The most effective inorganic formulation is a combination of materials whose strong absorption bands are in different places that, when taken as a whole, substantially cover the thermal infrared region. It is important to note that such combinations can be made either by i) blending separate inorganic particulates together when making the composite; or ii) melting the combined inorganics to form a glass, and then creating a particulate from the glass by milling or other techniques. An example of an effective combination of inorganics is silica and alumina. They can be obtained in combined form (with some adjuncts) as borosilicate glass.

It may be necessary to coat the surface of the inorganic particles in a way that makes the particles compatible with the plastic resin. This coating may be applied before creating the composite mixture, or it may be accomplished by adding the coating material to the plastic resin during blending. Such techniques are well know in the arts of plastics processing, and were reviewed in the background section of this patent.

There are a number of ways by which an inorganic/plastic composite can be made. The inventors have found two approaches that are particularly effective:

i) The inorganic particulate is blended with the plastic resin to create a composite, and this inorganic/plastic composite is then used in a honeycomb manufacturing process, in place of the usual plastic. To manufacturing an inorganic/plastic composite honeycomb via a film-fabrication, the inorganic/plastic composite is first formed into a film by one of the usual film-making techniques. This inorganic/plastic composite film, either alone or in conjunction with co-extruded or laminated layers, is then used to make honeycomb, in the same way as plastic film. Likewise, the inorganic/plastic composite can be used directly to make extruded honeycomb, or to make plastic capillaries, which are the precursor for a capillary-bundled honeycomb.

ii) The inorganic particulate can be blended with the polymer into a liquid or powder coating formulation, that cures either upon exposure to air, heat, UV light or other, or through the addition of a curing agent. This liquid formulation can be a) coated onto alreadyfabricated honeycomb, and allowed to cure, thus forming an infrared-absorbing layer; b) used to form such a layer on capillaries which are precursors for capillary-bundled honeycombs, or c) coated onto film which is the precursor for film-fabricated honeycombs (the coating may be applied to one side or both sides of a film, or the inorganic/plastic-containing liquid may be used as a laminating adhesive and applied between two layers of film).

It is possible to make inorganic/plastic composites that are clear, or that have some degree of light scattering ability, haze, or cloudiness, and this possibility can be used advantageously in this invention. A clear composite is useful for making a honeycomb transparent insulation that has maximal light transmittance 'Clear' in this context is taken to mean that light transmitted by the material substantially retains the same direction, and is not scattered over a wide angle. Such small-angle scatters can be used to make a high transmittance honeycomb transparent insulation, even though they may not be considered clear for purposes of transmitting images.

A cloudy or hazy composite is useful to making a honeycomb transparent insulation material that has reduced light transmittance and increased diffusing ability. Reduced light transmittance is useful in certain applications, such as in sunrooms or atriums, where high-transmittance glazing systems would result in excessive brightness in the interior space. Reduction of light transmittance by backscattering from non-absorbing inorganic particulate is advantageous over using a light absorber, because the problem of heat buildup inside the glazing system is avoided.

The appearance of a non-light-absorbing inorganic/plastic composite depends on a number of factors. Haziness can result from the following:

i) haze in the plastic resin (generally related to the crystalline state of the plastic resin, and dependent resin composition, additives, and conditions during cooling or curing);

ii) haze in the plastic resin induced through surface chemistry of the particulate;

iii) light scattering by the inorganic particles, which occurs if the indices of refraction of the inorganic particles and the plastic resin differ significantly, and if particles and inter-particle spacing are on the order of, or larger than, the wavelength of visible light.

iv) inhomogeneities resulting from clumping or imperfect dispersion of the inorganic particulate; and v) surface roughness, induced by the presence of the inorganic particulate or other causes.

A clear composite can be created by choosing an inorganic material and a plastic resin with indices of refraction that are very close. A number of examples are provided in U.S. Pat. No. 5,256,473, which describes composites made from silica of average particle size 4 urn (about 8 times the wavelength of green light), and plastics including polypropylene with an index of refraction of 1.49. The inventors have made clear polypropylene formulations with such index-matched large particles as precipitated silica and glass microspheres. Unless the index match is perfect, the composite should contain as few particles as possible whose dimensions are about the same as visible light (green light is about 0.5 urn wavelength), because resonant light scattering effects can create significant haze.

Another approach to making clear formulations is to use inorganics with a particle size that is much smaller than the wavelength of visible light. A composite made of such particles uniformly dispersed in a binder, with a mean inter-particle distance that is less than a wavelength of visible light, appears as nearly homogeneous to light, and therefore such a composite is ineffective as a light scatterer and appears clear. Examples of such materials are fumed silica (7–14 nm dia.), polishing-grade alumina (50 nm), and nanopigments made of metal oxides of particle size 10 nm–200 nm (described in U.S. Pat. No. 5,756,110). U.S. Pat. No. 5,683,501 state that 200 nm as a practical upper particle size limit for creating a clear composite via this approach. The authors of the present invention have made clear composites with small inorganic particles, including fumed silica and polishing-grade alumina., with plastics such as polypropylene, polyurethane, and acrylic.

It is straightforward to make a composite that scatters light so as to be useful in creating honeycomb transparent insulation with reduced light transmittance. In fact, if specific measures are not taken, this will usually be the result when an inorganic particulate is included in a plastic resin in significant porportion. An example of a useful cloudy formulation that absorbs thermal infrared radiation is kaolin (a fine white clay) blended into polypropylene thermoplastic resin. Kaolin masterbatches are readily available from most plastics-additive suppliers, and kaolin is a standard product for increasing the thermal infrared absorption of polyethylene films for greenhouse covering applications.

EXAMPLE 1

As an example of an extrudable inorganic/plastic composite, borosilicate glass microspheres of size ranging from 5 um to 30 um (Duraspheres®) by Mo-Sci Corporation, Rolla, Mo.) was surface-treated with vinyl-functional silane (Addid® 930 by Wacker Silicones Corp., Adrian, Mich.) to improve compatibility with plastic resin. To do this, the silane was first dissolved in hexane, and then the glass spheres were immersed in the solution for 1 hour. The excess solution was then discarded. The ratio of silane to glass was approximately 0.5% by weight. This treated glass was then mixed with polypropylene 'regrind fluff' (ground scrap polypropylene film 0.001" thickness, remaining dimensions on the order of 0.050" ) in order to predisperse the mixture. The fluff/glass mixture was then combined with virgin polypropylene resin pellets (Exxon 9513, Exxon Corp., Baytown, Tex.) in a lab-scale cast film extrusion system (Randcastle Extrusion Ltd., Cedar Grove, N.J.). The resultant composite film was approximately 0.003" thick, and was allowed to cure for 3 days, before being slit/rewound. It was then used to make film-fabricated honeycomb transparent insulation of 2.5" thickness and 0.393" cell diameter, very similar to InsolCore transparent insulation (Advanced Glazings Ltd., North Sydney, NS Canada). Hollands supra describes making a different film-fabricated honeycomb.

This composite film was largely clear, since the glass spheres had an index of refraction of approximately 1.52, and the polypropylene 1.49. Some surface scattering was present, the roughness being caused by the large size of the spheres, which raised the surface of the film which was not in contact with the casting roll. The infrared absorption of the film was measured with a fourier-transform infrared spectrophotometer, and the data was wavelength-averaged with respect to a 300K blackbody spectrum. The film was found to have a thermal emissivity of 21.3% and this honeycomb transparent insulation has a heat transfer coefficient of 3.5 W/m$^2$C. This represents a substantial improvement over a pure polypropylene honeycomb (with wall thickness of 0.001" ) which would have emissivity of approximately 11% and a heat transfer coefficient of 4.5W/m2C.

EXAMPLE 2

As an example of a coating formulation, 10 ml of Alpha 8011 water-based acrylic pressure sensitive adhesive Alpha Systems, Elkhart Ind.) was mixed with 10 ml of borosilicate glass microspheres (Duraspheres® by Mo-Sci Corporation, Rolla, Mo.) which were surface-treated with vinyl-functional silane as per the last example. This mixture was applied to a layer of high-clarity cast polypropylene film (MPP501, 0.001" thickness, Copol International Ltd., North Sydney NS Canada) and allowed to dry. The result was a relatively clear coating, of thickness on the order of 0.003". The infrared spectrum was measured and wavelength-integrated with respect to a 300K blackbody spectrum. The thermal emissivity was determined to be 0.80, and from FIG. 5 of Hollands, the heat transfer coefficient of a thin-walled honeycomb transparent insulation with overall thickness 2.5" and cell hydraulic diameter 0.393", whose walls were coated in this manner, would have a heat transfer coefficient of approximately 1.65 W/m2C, a substantial improvement over a similar honeycomb transparent insulation made with uncoated walls of 0.001" polypropylene which has a heat transfer coefficient of approximately 4.5 W/m2C.

The described honeycomb insulation can be made lighter and offer better thermal isolation than was possible using prior art techniques.

What is claimed is:

1. In a glazing system comprising a honeycomb transparent insulation sandwiched between glass and comprising an array of open-ended cell whose axes are oriented normal to the plane of the insulation, the improvement wherein said cells have walls comprising a composite material consisting essentially of inorganic particles having strong absorption/emissivity in the thermal infrared wavelength regions and negligible absorption in the visible (400 nm to 700 nm regions) dispersed in a plastic resin binder, said inorganic particles and said plastic resin binder have substantially matching refractive indices for visible light, and said inorganic particles have a size selected from the group consisting of a first range less than 200 nm and a second range between 1 and 30 µm, whereby said honeycomb insulation is substantially clear.

2. A glazing system as claimed in claim 1, wherein the walls of said cells are made of a plastic sheet coated with said composite material.

3. A glazing system as claimed in claim 1, wherein the walls of said cells are made of said composite material.

4. A glazing system as claimed in claim 1, wherein said inorganic particles comprise a combination of inorganic materials selected such that their maximum absorption bands cover different parts of the infrared spectrum so they work together to maximize absorption per unit mass or volume of material.

5. A glazing system as claimed in claim 1, wherein said plastic resin binder is selected from the group consisting of: polypropylene, polyethylene, polyvinyl chloride, acrylic, polycarbonate, polyurethane, polyester, fluoropolymers, UV or thermal stabilizers, and UV absorbers.

6. A glazing system as claimed in claim 1, wherein said inorganic particles are selected from the group consisting of: silica (natural or synthetic, fused or crystalline, in pyrolytic (fumed), precipitated, or milled forms), glass (soda lime, borosilicate, or other compositions, in microsphere, fibre, and milled form), kaolin, alumnia, various aluminosilicate compounds, and titanium dioxide.

7. A glazing system as claimed in claim 1, wherein said inorganic particles are surface-treated with a compatibility-enhancing agent.

8. A glazing system as claimed in claim 7, wherein said compatibility-enhancing agent is vinyl-functional silane.

9. A glazing system as claimed in claim 1, wherein said size lies in the range 1–10 µm.

10. A glazing system as claimed in claim 1, wherein said inorganic particles are borosilicate glass microspheres.

11. A method of making a glazing system comprising:
providing a plastic resin and plurality of inorganic particles, said plastic resin and said inorganic particles having substantially matching refractive indices, said inorganic particles having strong absorption/emissivity in the thermal infrared wavelength regions and negligible absorption in the visible (400 nm to 700 nm regions) and said inorganic particles having a size selected from the group consisting of a first range less than 200 nm and a second range between 1 and 30 µm;
blending said inorganic particles with said plastic resin to form a substantially clear composite film; and
manufactureing from said film a honeycomb insulation sheet comprising an array of radiation absorbing open-ended cells whose axes are oriented normal to the plane of the insulation; and
sandwiching said honeycomb sheet between glass.

12. A method as claimed in claim 11, wherein said composite film is co-extruded with a laminate layer to form a composite film that is used to make said array of open-ended cells.

13. A method as claimed in claim 12, wherein said composite film is formed into said film by curing.

14. A method as claimed in claim 11, wherein said composite film is coated onto a pre-existing honeycomb of open-ended cells.

* * * * *